Patented Mar. 4, 1947

2,416,821

UNITED STATES PATENT OFFICE 2,416,821

BACTERIOSTATIC SUBSTANCES

Charles Edward Coulthard, Wallace Frank Short, and Robert Michaelis, Nottingham, England, assignors to Therapeutic Research Corporation of Great Britain Limited, London, England, a British company No Drawing. Application October 9, 1942, Serial No. 461,498. In Great Britain October 14, 1941

10 Claims. (Cl. 195—35)

This invention relates to the production of a substance having an anti-bacterial action.

Extending the work of Fleming, Brit. J. exp. Path 1929, 10, 226, Maclean Rogers and Fleming, Lancet 1939, I, 562, and others, Chain, Florey, Gardner, Heatley, Jennings, Orr-Ewing and Sanders, Lancet 1940, 2, 226, and again, Abraham, Gardner, Chain, Heatley, Fletcher, Jennings and Florey, Lancet, 1941, 2, 177, have described a method by which from a growth of *Penicillium notatum* in a Czapek-Dox culture medium containing 4% of glucose, an anti-bacterial substance which has been called penicillin can be isolated.

During the fermentation by the method described in the literature referred to, the hydrogen ion concentration of the culture medium, after an initial swing of short duration in the acid direction, returns to the neutral point or even goes beyond it. When the fermentation is complete, the penicillin, which is soluble in organic solvents, is extracted from the neutral or alkaline medium with amyl acetate, a yield of about 0.013 gram of penicillin from 1 litre of the culture medium being obtained.

It has now been found that, if a strain of *Penicillium notatum* is used, selected as will be more fully explained below, the hydrogen ion concentration remains on the acid side for a much longer period, in fact of 14 days or more, during the development of the penicillium culture and a substance having a powerful bacteriostatic action, but which in other respects is fundamentally different from the aforesaid penicillin, being for example insoluble or only slightly soluble in common organic solvents, can be isolated from the acid medium; the substance moreover is obtained in better yield than penicillin.

According to the present invention therefore, a substance having bacteriostatic activity, which is hereinafter termed "Notatin," and differs from penicillin inter alia in that it is insoluble or only slightly soluble in common organic solvents is produced by selecting a strain of *Penicillium notatum* which possesses the property, when grown on a suitable culture medium, for example a Czapek-Dox medium containing 4% of glucose and having an initial pH of about 6.5, of maintaining the pH of the culture medium on the acid side for a considerable period, e. g. 14 days, during its growth, inoculating a culture medium with the selected strain, incubating the medium at a temperature of about 20° C. under the acid conditions secured by the action of the mold and isolating the Notatin from the medium while acid. The medium will eventually become alkaline if incubation is sufficiently prolonged and care must therefore be taken to isolate the Notatin from the medium while the medium is still acid.

The selection of a suitable strain of the mold is important since otherwise Notatin will not be formed. A suitable strain of *Penicillium notatum* may be obtained by selecting from a culture of the mold, colonies producing a substance having a powerful inhibitive effect on Gram-positive bacteria in the presence of glucose. The selected colonies are then grown on a Czapek-Dox medium containing 4% glucose and the culture filtrates are tested for bacteriostatic activity and for solubility of the active phinciple in organic solvents. Those strains from which the culture filtrates exhibit the most powerful bacteriostatic effect and of which the active principle in the filtrates is not extractible with organic solvents are then selected for use.

Then in the preparation of Notatin, a suitable culture medium, for example a Czapek-Dox containing 4% of glucose, is sterilized and inoculated with the selected strain and incubated at a temperature of about 20° C. in the usual manner, until little glucose remains, usually about 8 to 14 days. During incubation, the pH of the medium falls to about 3.5 after 3 or 4 days and remains at this figure for the remainder of the incubation period. If, however, the incubation is unduly prolonged the medium will become alkaline and the Notatin will ultimately be lost.

The Notatin is then isolated from the culture filtrate, for example by evaporation of the filtrate under reduced pressure or by freezing out a proportion of the water and then precipitating the concentrate with an organic solvent.

In order that the invention may be easily understood and readily carried into effect the following detailed example is given.

A culture medium having the following composition is prepared:

| | | |
|---|---|---|
| Sodium nitrate B. P .C | grams | 2 |
| Pot. acid phosphate B. P. C | do | 1 |
| Pot. chloride B. P. C | do | 0.5 |
| Magnesium sulphate cryst. B. P | do | 0.5 |
| Ferrous sulphate cryst. B. P. C | do | 0.01 |
| Glucose | do | 40 |
| Tap water | cubic centimeters | 1000 |

This medium has a pH of about 6.5 and is sterilized, for example, by steaming for 1½ hours, or by autoclaving at 115° C. for 30 minutes.

Cultures of *Penicillium notatum* are grown on ordinary nutrient agar and from these are selected colonies producing a substance which is powerfully inhibitive for Gram positive bacteria in the presence of glucose. Cultures are then made, on the above specified culture medium, of the colonies having the most powerful inhibitive effect and the culture filtrates therefrom are tested for bacteriostatic activity and the active principle in the filtrates is tested for insolubility in organic solvents. The cultures from which the culture filtrates have the highest bacteriostatic activity and the active principle of which is most insoluble in organic solvents are selected for use. Suitable cultures usually have a pale grey-green appearance on the top surface and are white or yellow on the under surface.

Batches of 450-500 c. c. of a culture medium having the composition given above are introduced into 40 oz. white flint-glass panelled bottles which are then plugged with cotton wool and sterilized by steaming for 1½ hours, and these batches are sown from a culture of the strain of *Penicillium notatum* which has been selected in the manner described and has been grown for about 14 days on a shallow layer of the same culture medium. The sown medium is incubated at approximately 20° C. in shallow layers in the bottles which are placed on their sides until bacteriological tests indicate a high concentration of bacteriostatic principle and little glucose remains.

The pH of the medium at the commencement is about 6.5, after 3 or 4 days incubation it falls to about 3.5, and remains at this figure throughout the incubation period, usually of 8 to 14 days. An even growth of the mold appears on the surface of the medium in 3 or 4 days, this develops gradually, being first white and then often turning to a pale grey-green.

The liquor, when of suitable basteriostatic efficiency and low glucose content, is decanted from the mycelium and filtered. The filtrate may be stored at a low temperature, preferably with the addition of a preservative, such as 1 c. c. per liter of chloroform.

Isolation of the Notatin is preferably effected by evaporation of the filtrate down to one-fifth of the volume preferably below an internal temperature of 26° C. and under reduced pressure. Alternatively, the isolation may be effected as indicated above, by freezing out a proportion of the water in the culture filtrate and then precipitating the concentrate with an organic solvent, preferably acetone. Thus, for example, the isolation of the active substance from the culture filtrate obtained by fermentation, as aforesaid, under acid conditions may be carried out by cooling the culture filtrate in a freezing mixture with stirring so that part of the water is frozen and separates in the form of a soft paste of ice-crystals which is then removed by filtration through a suitably cooled funnel. The filtrate is then frozen and the series of operations is repeated, say five times in all, so that the final filtrate amounts to about one-fifth of the volume of the culture filtrate employed. The final filtrate is then precipitated by adding three times its volume of a solvent miscible with water, for example, acetone. This causes the separation of the crude active principle as a voluminous amorphous solid. A further quantity can be obtained from the ice-crystals by fractional thawing and precipitation with a solvent in the manner already described.

It is, of course, to be understood that the quantitative data given in the above example are merely for the purposes of illustration and that variations, for example in the amount of water removed and in the amount of solvent employed can be made in applying the method to a culture filtrate of different activity: further culture media of different composition from that specified in the example might also be used.

The crude active material may be purified by solution in water and reprecipitation with acetone and by trituration with acetone, alcohol, ether, or other suitable organic solvent.

The substance thus obtained is a light brown or yellowish, hygroscopic, amorphous solid which, as regards its anti-bacterial action, is at least as active as penicillin although its other properties are very different from those of penicillin as described in the above-mentioned literature. Thus the substance cannot be extracted from an acid aqueous solution by means of amyl acetate and is insoluble, or only slightly soluble, in common organic solvents, but is soluble in water to a faintly turbid solution having an acid reaction. The yield of Notatin is at least 0.5 gram per liter of culture filtrate and, moreover, it possesses a very high bacteriostatic efficacy.

We claim:

1. A process for the production of a substance having bacteriostatic activity, which comprises inoculating a culture medium with a strain of *Penicillium notatum* which possesses the property, when grown on a Czapek-Dox medium containing 4% of glucose, of maintaining the culture medium on the acid side for a period of fourteen days during its growth, incubating the inoculated medium under the acid conditions resulting from the action of the mold and isolating the bacteriostatic principle from the culture medium while the latter is acid.

2. A process for the production of a substance having bacteriostatic activity, which comprises inoculating a culture medium having a pH of about 6.5 with a strain of *Penicillium notatum* which possesses the property, when grown on a Czapek-Dox medium containing 4% of glucose, of maintaining the culture medium on the acid side for a period of fourteen days during its growth, incubating the inoculated medium under the acid conditions resulting from the action of the mold and isolating the bacteriostatic principle from the culture medium while the latter is acid.

3. A process for the production of a substance having bacteriostatic activity which comprises inoculating a Czapek-Dox medium containing about 4% of glucose with a strain of *Penicillium notatum* which possesses the property, when grown on a Czapek-Dox medium containing 4% of glucose, of maintaining the culture medium on the acid for a period of fourteen days during its growth, incubating the inoculated medium under the acid conditions resulting from the action of the mold and isolating the bacteriostatic principle from the culture medium while the latter is acid.

4. A process for the production of a substance having bacteriostatic activity, which comprises the steps of selecting from a culture of *Penicillium notatum* colonies, those colonies producing the most powerful inhibitive effect on Gram-positive bacteria in the presence of glucose, making cultures from the latter colonies on a Czapek-Dox medium containing about 4% glucose, selecting those cultures from which the filtrates have high bacteriostatic efficiency and the active principle is not extractible with amyl acetate, inoculating a culture medium with the selected strain, incubating the inoculated medium under the acid conditions resulting from the action of the mold and isolating the bacteriostatic principle from the culture medium while the latter is acid.

5. A process for the production of a substance having bacteriostatic activity which comprises inoculating a culture medium with a strain of *Penicillium notatum* which possesses the property, when grown on a Czapek-Dox culture medium containing 4% of glucose, of maintaining the culture medium on the acid side for a period of fourteen days during its growth, incubating the inoculated medium under the acid conditions resulting from the action of the mold, filtering the medium while acid, and separating the active principle in the filtrate by precipitation.

6. A process for the production of a substance having bacteriostatic activity, which comprises inoculating a culture medium with a strain of *Penicillium notatum* which possesses the property, when grown on a Czapek-Dox culture medium containing 4% of glucose, of maintaining the culture medium on the acid side for a period of fourteen days during its growth, incubating the inoculated medium under the acid conditions resulting from the action of the mold, filtering the medium while acid, concentrating the filtrate by evaporation under reduced pressure and precipitating the concentrate with an organic solvent.

7. A process for the production of a substance having bacteriostatic activity, which comprises inoculating a culture medium with a strain of *Penicillium notatum* which possesses the property, when grown on a Czapek-Dox culture medium containing 4% of glucose, of maintaining the culture medium on the acid side for a period of fourteen days during its growth, incubating the inoculated medium under the acid conditions resulting from the action of the mold, filtering the medium while acid, concentrating the filtrate by freezing out a proportion of the water and precipitating the concentrate with an organic solvent.

8. A process as claimed in claim 6, in which the organic solvent is acetone.

9. A process as claimed in claim 7 in which the organic solvent is acetone.

10. A process for the production of a substance having bacteriostatic activity which comprises growing a strain of *Penicillium notatum* on a culture medium under acid conditions resulting from the action of the mold, said strain possessing the property, when grown on a Czapek-Dox culture medium containing 4% of glucose, of maintaining the culture medium on the acid side for a period of fourteen days, and isolating the bacteriostatic principle which is insoluble in amyl acetate from the culture medium while the latter is acid.

CHARLES EDWARD COULTHARD.
ROBERT MICHAELIS.
WALLACE FRANK SHORT.

REFERENCES CITED

The following references are of record in the file of this patent:

FOREIGN PATENTS

| Number | Country | Date |
|---|---|---|
| 552,619 | British | Apr. 16, 1943 |

OTHER REFERENCES

Abraham et al., "The Lancet," vol. II of August 16, 1941, pages 177–181.

Roberts et al., Jr., Biol. Chem. January 1943, vol. 147, No. 1, pages 47 to 58.

Kocholaty, Jr., Bact. July 1942, page 43. (Copy in Scientific Library.)

Dubos, "Jr. Pediatrics," November 1941, pages 588–595.

Science, July 3, 1942, pages 20–21. (Photostat in Div. 59.)

"Nature," Nov. 28, 1942, pages 634–635.

Van Bruggen et al., Jr., Biol. Chem., May 1943, page 365.

Mfg. Chemist & Mfg. Perfumer, Article by Phillips, April 1943, page 108. "Notatin," Jr., Biol. Chem., May 1943, Birkinshaw et al., pages 459–460.